United States Patent
Nalliannan

(10) Patent No.: US 11,201,954 B2
(45) Date of Patent: Dec. 14, 2021

(54) SYSTEMS AND METHODS FOR BINARY MESSAGE TRANSFORMATION USING CUSTOM DESCRIPTORS

(71) Applicant: Verizon Patent and Licensing Inc., Arlington, VA (US)

(72) Inventor: Suresh Nalliannan, Suwanee, GA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 97 days.

(21) Appl. No.: 16/699,583

(22) Filed: Nov. 30, 2019

(65) Prior Publication Data
US 2021/0168224 A1   Jun. 3, 2021

(51) Int. Cl.
*H04L 29/06*   (2006.01)

(52) U.S. Cl.
CPC .............. *H04L 69/06* (2013.01); *H04L 69/08* (2013.01)

(58) Field of Classification Search
CPC ................................ H04L 69/06; H04L 69/08
See application file for complete search history.

(56) References Cited

U.S. PATENT DOCUMENTS

| | | | | |
|---|---|---|---|---|
| 2015/0373149 | A1* | 12/2015 | Lyons | G05B 17/02 709/203 |
| 2017/0041785 | A1* | 2/2017 | Bone | H04L 69/08 |
| 2017/0325125 | A1* | 11/2017 | Novo Diaz | H04L 69/04 |
| 2018/0288127 | A1* | 10/2018 | Zaidi | H04L 63/04 |

* cited by examiner

*Primary Examiner* — Charles C Jiang
*Assistant Examiner* — Shawn D Miller

(57) ABSTRACT

A device may receive a message originating from or being sent to a machine-type device. The machine-type device may use one of a plurality of binary message formats that includes message values, and the message values may be have specific locations or sizes within the message. The device may determine a particular binary format used by the machine-type device, and identify a set of descriptor language expressions that define a translation between the binary format and a structured data format used by a service device communicating with the machine-type device. The device may generate an output message using the set of descriptor language expressions, and provide the output message to the destination device.

20 Claims, 7 Drawing Sheets

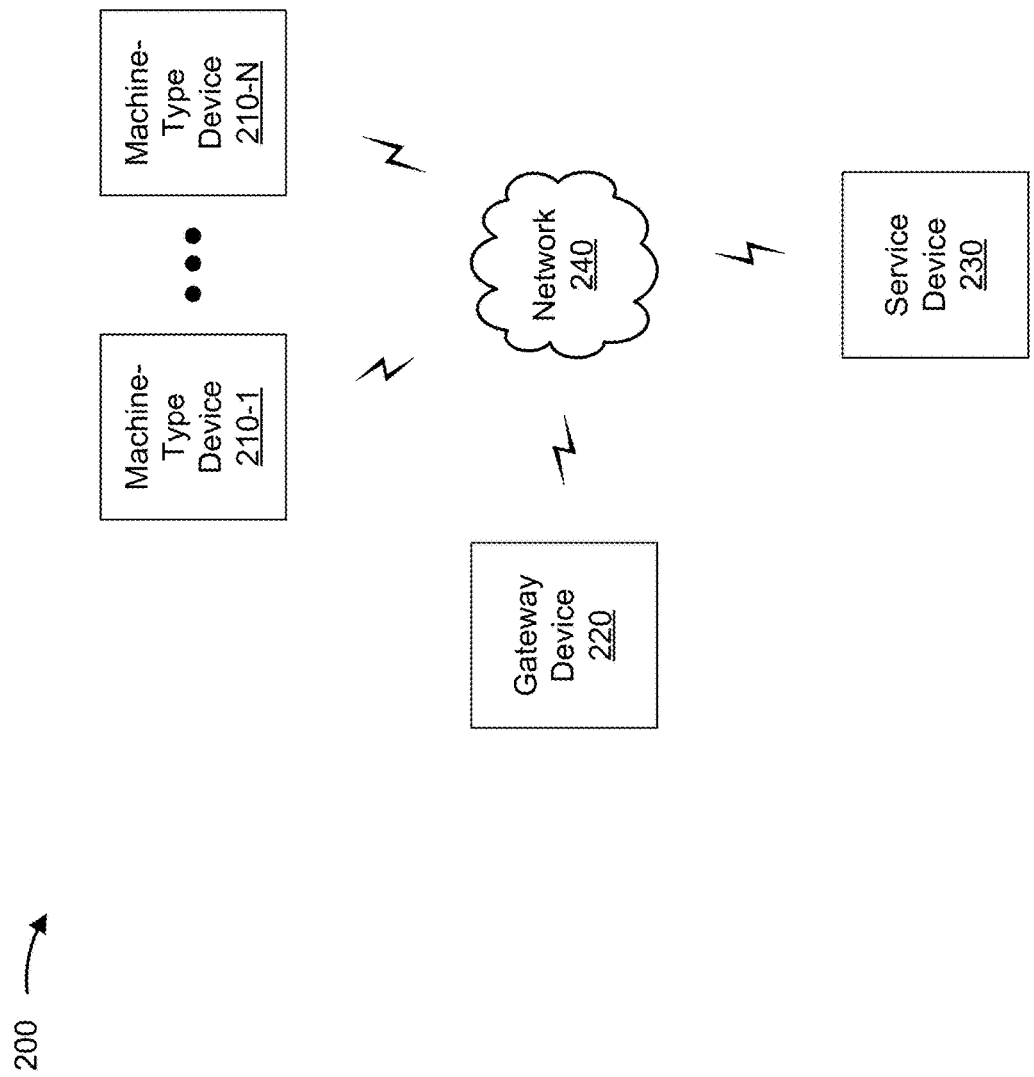

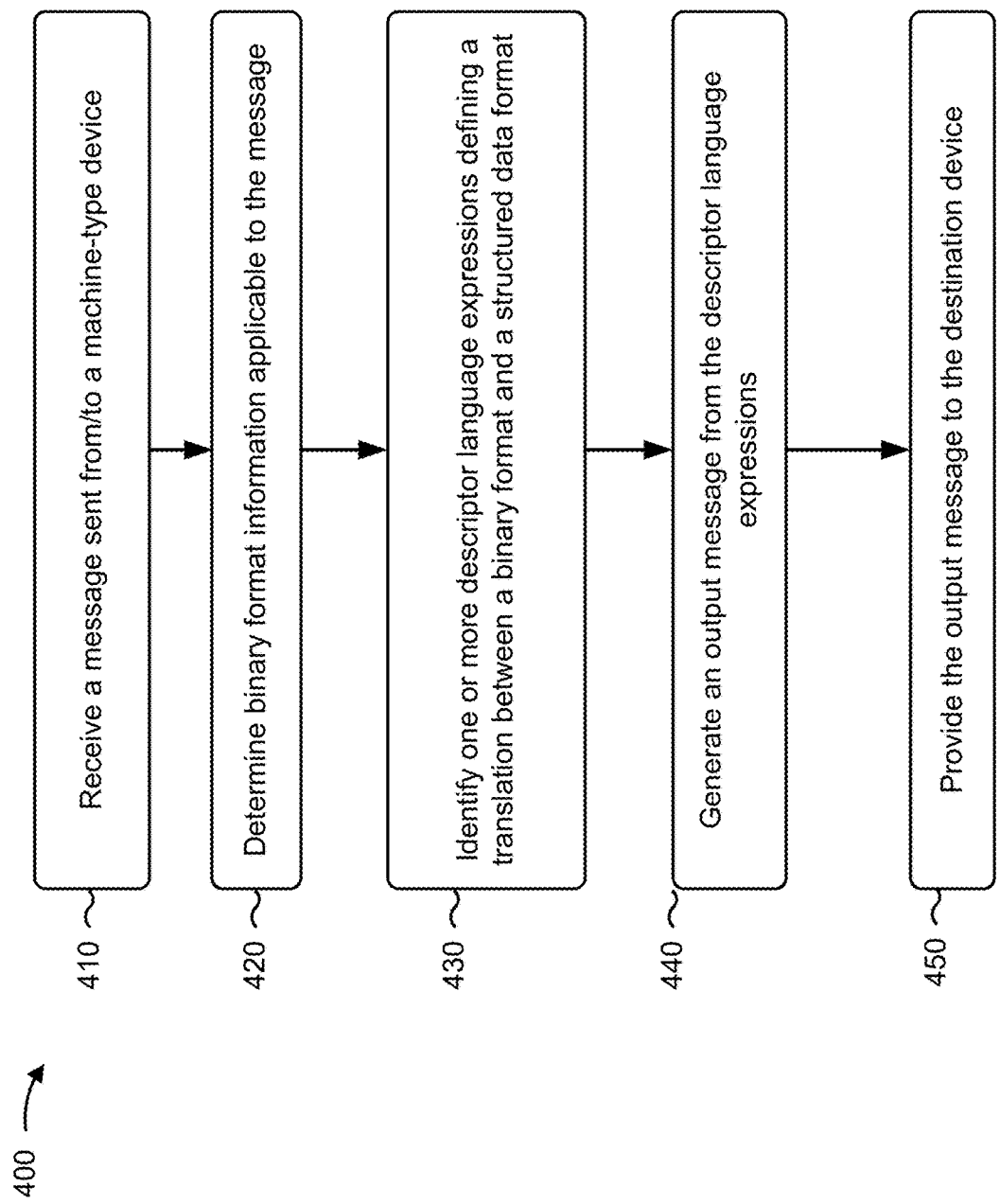

SYSTEMS AND METHODS FOR BINARY MESSAGE TRANSFORMATION USING CUSTOM DESCRIPTORS

BACKGROUND

Machine-type devices, such as for the internet of things (IoT), may have various device capabilities and operating domains. There are some standards for machine to machine (M2M) communications by the machine-type devices, such as an open platform communications (OPC) unified architecture (UA) standard. There are also many protocols for M2M communications, including a building automation and control networks (BACnet) protocol, hypertext transfer protocol (HTTP), message queue telemetry transport (MATT) protocol, advanced message queuing protocol (AMQP), JavaScript object notation (JSON) protocol, extensible markup language (XML) protocol, and/or the like. Machine-type devices may use various proprietary protocols for M2M communications.

BRIEF DESCRIPTION OF THE DRAWINGS

FIG. 2 is a diagram of an example environment in which systems and/or methods described herein may be implemented.

FIG. 4 is a flow chart of an example process for binary message transformation using a message descriptor language.

DETAILED DESCRIPTION OF PREFERRED EMBODIMENTS

Figure 1A:
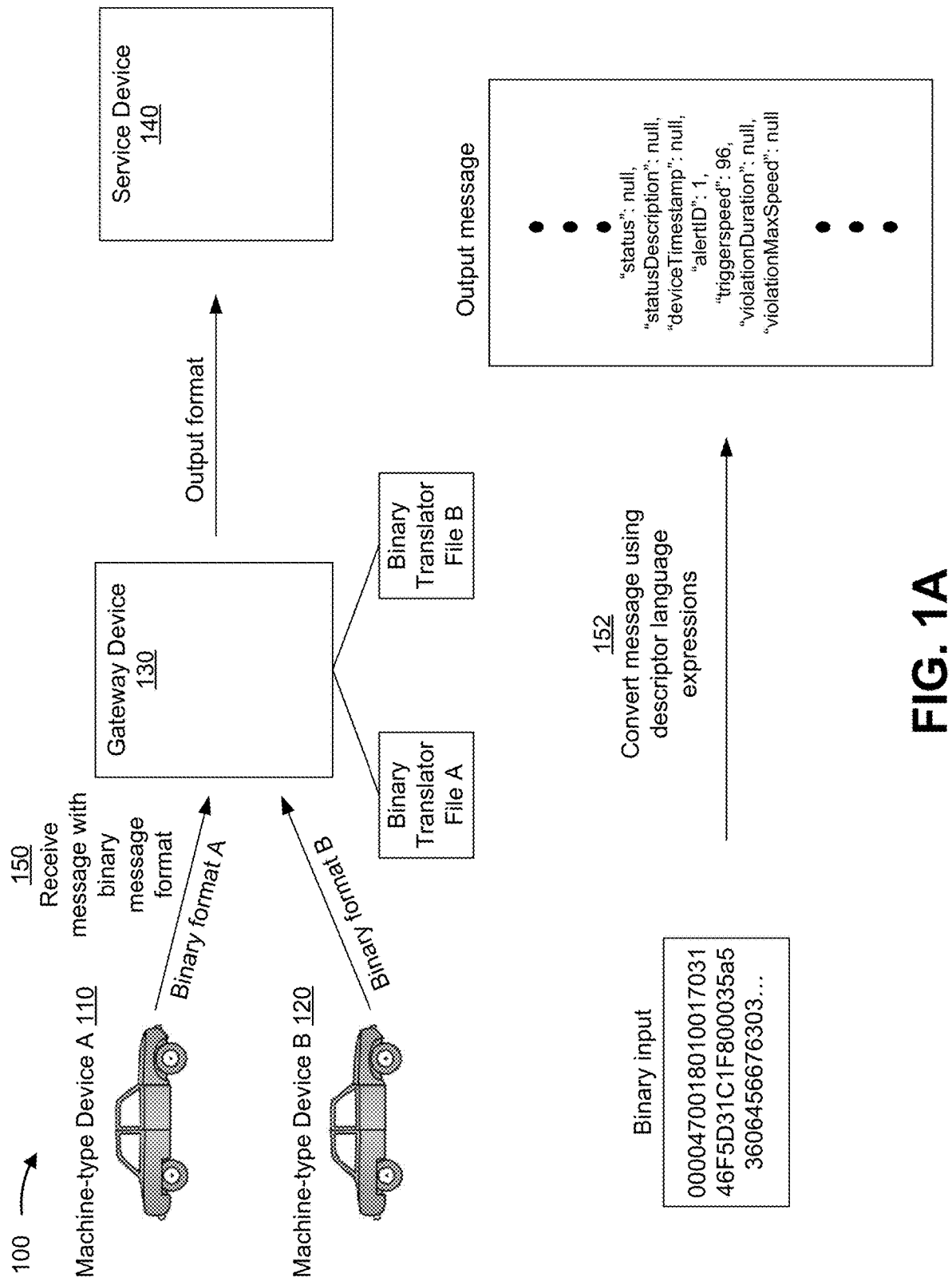
FIGS. 1A-1D are diagrams of one or more example implementations described herein.

The following detailed description of example implementations refers to the accompanying drawings. The same reference numbers in different drawings may identify the same or similar elements.

In some instances, there are various protocols for M2M communications by machine-type devices (e.g., IoT devices). Some machine-type devices transmit and receive binary messages because this allows the machine-type device devices, which may be limited in power and capability, to provide information in compact messages. There are different types of machine-type devices that use different binary message formats. At the same time, services that use information from the binary messages may expect messages in a standard format, for example, a standard structured data format such as JavaScript object notation (JSON) protocol and extensible markup language (XML) protocol. In such cases, some intermediary or host device (e.g., gateway device) may need to translate custom binary messages to standard formats like JSON or XML. However, the gateway device may have binary message translators that are hard-coded, making it expensive and error prone to develop binary message translators for each binary format, and then update such translators as the binary format changes over time (e.g., through revisions, capability improvements, and error corrections). The gateway may expend extensive processing resources using, storing, and maintaining multiple hard-coded binary message translators, and delays may occur in being able to communicate with devices that use new binary formats.

Binary message formats may include data in non-standard sizes and across standard byte-boundaries. Data field types in standard format messages may be constricted to standard sizes and positions. For example, an integer data type is normally required to be 2 or 4 bytes, and data field positions are normally not flexible enough to start in a middle of a byte and/or to cross byte boundaries. Translators normally adhere to these expectations for standard data type sizes and positions. This inflexibility may lead to translation errors, wasted space and thus wasted memory resources. Translators may also have limited capability to accommodate logic associated with complex messages, such as conditional logic (e.g., if X is true, then the next N bits mean Y, else the next M bits mean Z), compound data (e.g., object structures, collection of fields of various types), and/or the like.

According to some implementations described herein, a device (e.g., a gateway device) may use a message descriptor language to describe any custom binary message format, such that the device may translate between a binary message format and a standard structured data format. In this way, the device may save processing resources by not using and maintaining multiple hard-coded binary message translators, which are difficult to create and modify, are error prone, and may consume execution and storage resources.

Furthermore, the device may use the message descriptor language to express data fields in more flexible terms, which may lead to more accurate and efficient output messages that are otherwise constricted to standard sizes and positions. For example, an integer data type is normally required to be 2 or 4 bytes. However, an integer data field may be expressed in the DSL to have a non-standard size (e.g., 7 bits), and may also start at a specific bit location within a byte and/or extend across a boundary to another byte. For example, a seven bit integer data field may start at bit 6 of byte 26 and end at bit 4 of byte 27. Existing protocol translators do not provide these flexible field definitions. This flexibility may lead to more accurate translations, less wasted space and thus less wasted memory resources. Additionally, the DSL may implement complex data types and translation logic, such as conditional logic, looping, complex data structures, and/or the like, and may do so using reusable components.

FIGS. 1A-1D are diagrams of one or more example implementations 100 described herein. FIGS. 1A-1D describe a machine-type device A 110 that uses a binary message format A and a machine-type device B 120 that uses a different binary message format B. Machine-type device A and machine-type device B may communicate with gateway device 130. Gateway device 130 may communicate with service device 140.

Machine-type device A 110 and machine-type device B 120 may be devices that are installed in various types of equipment. As shown by FIG. 1A, machine-type device A 110 and machine-type device B 120 may be installed in separate vehicles by different manufacturers. In other examples, the machine-type devices may be installed in other devices, such as industrial equipment, environmental sensors, metering devices, and other types of connected devices. In such cases, binary message format A may have a different format than binary message format B.

Gateway device 130 is a device configured to translate messages between machine-type devices and a standard format used by a service device 140. Service device 140 may be an application server, a field device, and/or any other type of device that may utilize information from machine-type devices. In some implementations, gateway device 130 may be co-located with service device 140, or may be remotely located and connected through a communications facility (e.g., a network).

As shown by reference number 150, gateway device 130 may receive a message with binary message encoding that originated from machine-type device A 110. The message may be received directly from machine-type device A 110 or through an intermediary device (e.g., phone, tablet, field device, and/or the like). The message may be intended for service device 140. The binary message encoding may be in binary format A and may include locations and sizes for data values specified by the manufacturer of machine-type device A 110. The data values in the message may have non-standard locations and sizes because machine-type device A 110 may have packed information into as small a message as possible, for example, to conserve power and/or increase transmission efficiency.

As shown by reference number 152, gateway device 130 may convert the message in binary format A using one or more descriptor language expressions. A descriptor language expression may be a specification for translation of a data value in a binary message format expressed in a message descriptor language. The message descriptor language may be a common language for uniformly expressing instructions for translation of values between a binary format and a standard format. The message descriptor language may also be used for expressing data fields translated from a standard structured data format, or prior to translation to values in the one of the multiple binary formats. The message descriptor language may be a semantic language for expressing a data field as name/value expressions. For example, message descriptor language may map a message entirely encoded as binary 0/1 values into meaningful name/value structures such as "Vehicle Identification Number", "speed", or "pressure".

Gateway device 130 may use one or more binary translator files to translate an input message in binary format A into an output message in a standard format, or to translate an input message in a standard format into an output message in binary format A. The binary translator files may store descriptor language expressions in the message descriptor language that are used for translation. The descriptor file expressions may be based on a logical structure that defines how to parse data value information from a binary format. The logical structure may be obtained from a manufacturer or a service entity associated with a particular type of machine-type device.

Gateway device 130 may include a parser that parses segments of a binary encoded message based on the descriptor language expressions in a binary translator file. For example, the parser may parse out, for example, a string of 96 bits for a first data field and a next string of 8 bits for second data field. Gateway device 130 may use the descriptor language expressions to determine how to parse the binary message and how to translate the resulting value to a data field name/value expression in a standard structured data format. Continuing the previous example, the descriptor language expression may instruct the parser that the 96 bits corresponds to a field named "name" that uses 8-bit character data types with an 8 byte length, and that value should be inserted into the output message as a sub-element of a "model" data type.

In some implementations, the logical structure of the binary format may specify fewer or more bits than a standard size for a type of data value, and may specify starting locations within a message on non-byte boundaries. A descriptor language expression may be able to express a non-standard size and a non-byte boundary start location for the parser using bit-wise indexing and sizing. For example, a binary format used by a machine-type device may use less than the standard 16 bits for an integer data type, due to the machine-type device compacting data into a small message. The descriptor language expression may account for this non-standard size. For example, if a binary format requires 6 bits for an integer data type and the value starts on bit 1 of byte 4, the descriptor language expression for this integer may specify that the parser detect the binary value starting at byte 4, bit 1 with a 6 bit length as the value to be read, and translate the value into a name/value expression with an integer data type. In this way, gateway device 130 may be flexible enough to translate data values of non-standard sizes and starting locations from and to any binary format, based on a binary translator file.

Gateway device 130 may also do further processing on the result of the parsing using the descriptor language expressions in order to further translate the message into a desired output format. For example, the descriptor language expressions may cause the parser to translate a binary formatted message into a first structured data format, such as a JSON formatted message, however an application on service device 140 may require the message in a second structured data format, such as an XML format. Gateway 130 may convert the message output of the parser into the desired standard structured data format prior to providing the message to the intended service device 140. Because the parser output is a standard structured data format, the conversion may be accomplished using standard conversion tools (e.g., a JSON-XML converter). In some implementations, the parser may translate the binary formatted message into an XML format (or another standard format), and conversion may be performed from XML to the desired format.

A descriptor language expression may be implemented as a structured data element, for example, as a JSON object. Each descriptor language expression may be configured to provide information for each data field, including, for example, a name of the data field, whether the data field is a mandatory field, a start byte of the data field, a start bit of the data field, a byte size of the data field, a bit size of the data field, a type of the data field, an expression for how to resolve the value of the data field, and/or the like. A binary translator file may include multiple descriptor language expressions corresponding to each of the data values that may be present in a message, and multiple binary translator files may be used to define descriptor language expressions usable to translate a particular binary message format. Further details on binary translator files and descriptor language expressions are provided below.

Returning to reference number 152 in FIG. 1A, gateway device 130 may be configured to convert the message encoded with binary format A using one or more descriptor language expressions from a binary translator file A. Likewise, gateway device 130 may convert a message encoded with binary format B using one or more descriptor language expressions from a binary translator file B. New machine-type devices (e.g., from a new original equipment manufacturer, or OEM) may be associated with new binary translator files. Gateway device 130 may determine which binary translator file to use based on an indication of a binary format in the message, an identity of the network address/port/link from which the message was received, an identity of the machine-type device, an identity of the service device, translation information obtained from another device, and/or the like.

In some implementations, a first message having the same information as a second message, but encoded with a different binary format, may have a descriptor language expression that appears similar in content to a descriptor language expression of the second message, except that each descriptor language expression may have different values for locations and/or sizes of binary data values. This may be due to how different machine-type devices compact information into a small message. For example, two different binary formats associated with a vehicle may provide speed values, but one format may provide the speed value as a 7-bit integer at location Byte4bit5, while the other format may provide the speed value as a 6-bit integer at location Byte2bit6. A similar descriptor language expression can be used to obtain the speed data in each case, with the location and size information adjusted to match the format. This flexibility and reusability may be valuable when a device with a new type of binary format is deployed, or when an existing binary format is modified over time. There is no need to rewrite or install another hard-coded translator for a translating a particular binary message format to the standard format for the output message. Gateway device 130 may only need to incorporate a new binary translator file for the new type of machine-type device, which itself may reuse descriptor language elements from existing binary translator files. Gateway device 130 may save processing resources otherwise spent on adding a new hard-coded translator for binary format-to-standard format translation, reconfiguring one or more existing hard-coded translators, or managing the use and storage of multiple hard-coded translators.

Figure 1B:
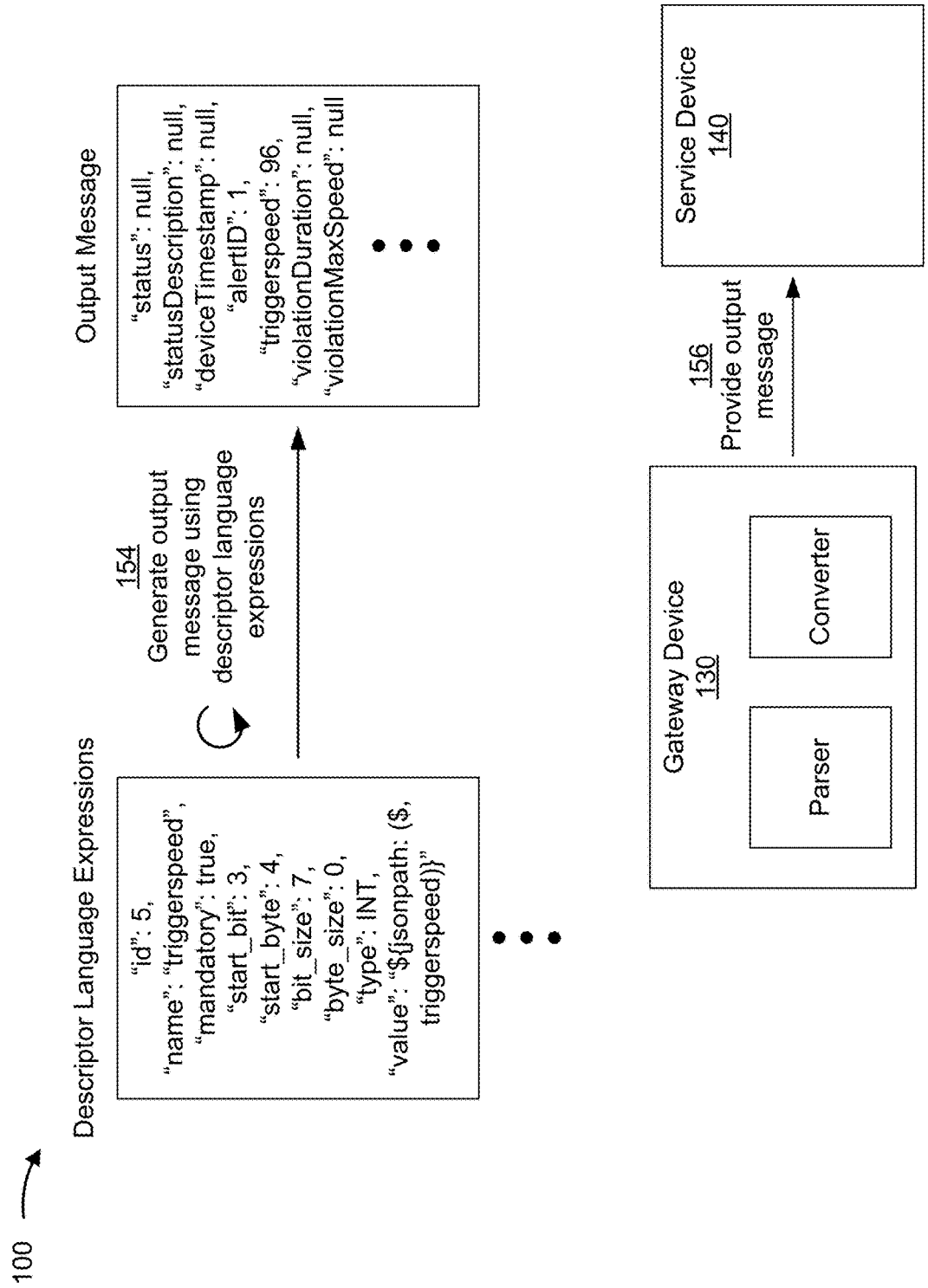

As shown by FIG. 1B, and by reference number 154, gateway device 130 may generate an output message using descriptor language expressions, based on a standard format. The output message may be in a standard structured data format, such as JSON or XML, used by service device 140. Each descriptor language expression may correspond to one or more data fields in the output message, and may provide instructions on how name/value expressions should be inserted into the output message. In some implementations, the output message may not include all data fields expressed in the descriptor language expressions and/or may fill in otherwise blank fields with default values.

In some implementations, gateway device 130 may have a converter that reads elements of an output message and converts each element into a different standard format, based on a standard format conversion algorithm. For example, gateway device 130 may include a converter that may convert between a JSON formatted message and an XML formatted message. Gateway device 130 may invoke a conversion, for example, where the service device 140 to which the message will be delivered requires the message in a different format than produced by the parser. Gateway device 130 may maintain information that indicates which service devices 140 require information in particular formats.

As shown by FIG. 1B, and by reference number 156, gateway device 130 may provide the output message to service device 140. Service device 140 may perform an operation on information in the output message. The operation may include analyzing information provided by machine-type device A 110, providing a service to machine-type device A 110, providing a service to another device associated with machine type device A 110, and/or the like. As a result of using descriptor language expressions to express data fields in the message descriptor language, gateway device 130 may convert a message from one of various binary message formats to a standard format expected by service device 140, without requiring development of, or a rewrite of, a hard-coded translator. This may save processing resources.

Figure 1C:
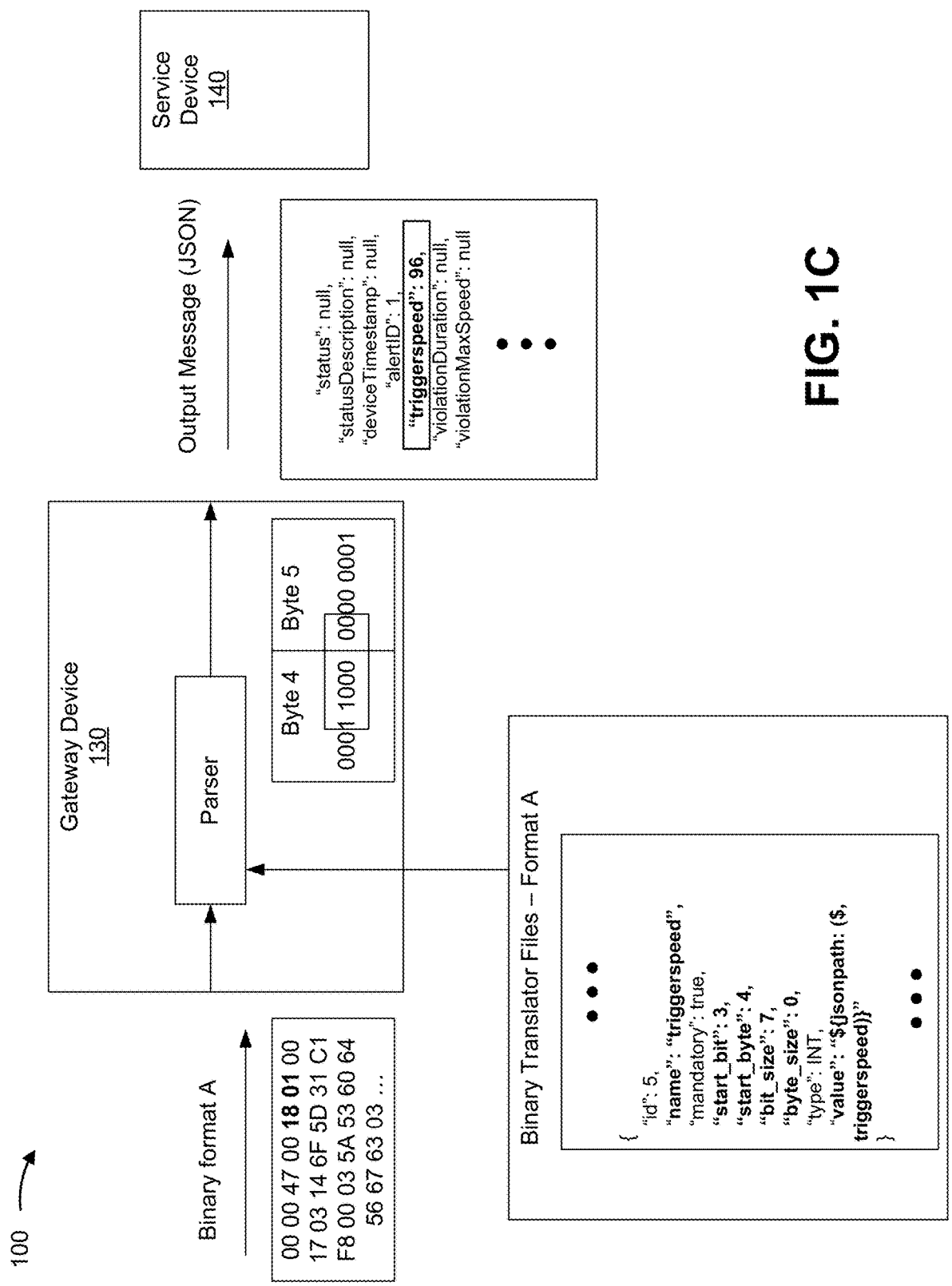

FIG. 1C illustrates an example of the operation of the translation. An input message with binary message encoding may be received with the following values (expressed in hexadecimal coding):

00004700180104010017026200C0000000016CBA638
3F000035953606456676
3030011AF121D48ED22C2652A53468C1BB06C020
40E6D5E8DDBBD19E402
6200C0000000016CBA6383F

Gateway device 130 may determine that this message is in binary format A, and retrieve binary translator file A. Within binary translator file A are one or more descriptor language expressions that express how to translate this message into field names/values in a standard structured data format. An example of a descriptor language expression may be:

```
...
{
    "id": 5,
        "name": "triggerSpeed",
        "mandatory": true,
        "start_bit": 3,
        "start_byte": 4,
        "bit_size": 7,
        "byte_size": 0,
        "type": "INT",
        "value": "${jsonpath:($.triggerSpeed)}"
}
...
```

Gateway device 130 may use the descriptor language expressions of the binary translator file to translate the message into a standard structured data format output message. From the example descriptor language expression, the binary value for a field named "triggerSpeed" is found in the message at Byte4bit3, having a 7 bit length and a data type of Integer. It must be present in the message ("mandatory: true"), and the value should be inserted into the output data structure as a JSON element below the root element with a name/value pair of "triggerSpeed": [value]. Applying this expression to the example input binary message, when the parser reaches Byte4bit3 in the message, it retrieves the value that is 7 bits long ("1100000"), generates a JSON element for the output message—"triggerSpeed":96—and inserts it into the output message structured data. (In the examples described herein, 0-starting indexes are assumed, and endian considerations are omitted. Alternatives are possible that would use 1-starting indexes and address big/little endian issues, as is well known.) An example of an output message may be:

```
{
    "status": null,
    "statusDescription": null,
    "deviceTimestamp": null,
    "alertId": 1,
    "triggerSpeed": 96,
    "violationDuration": null,
    "violationMaxSpeed": null,
    "vehicleSpeedFlag": null,
    "location": {
        "latitude": null,
        "longitude": null,
        "altitude": null,
```

```
        "heading": null,
        "precisionInMeters": null,
        "precisionTrueness": null
    }
}
``` where the other fields in the output message may have been generated using other descriptor language expressions in the binary translator file to translate other values in the binary message. The output message may then be sent to service device 140.

Figure 1D:
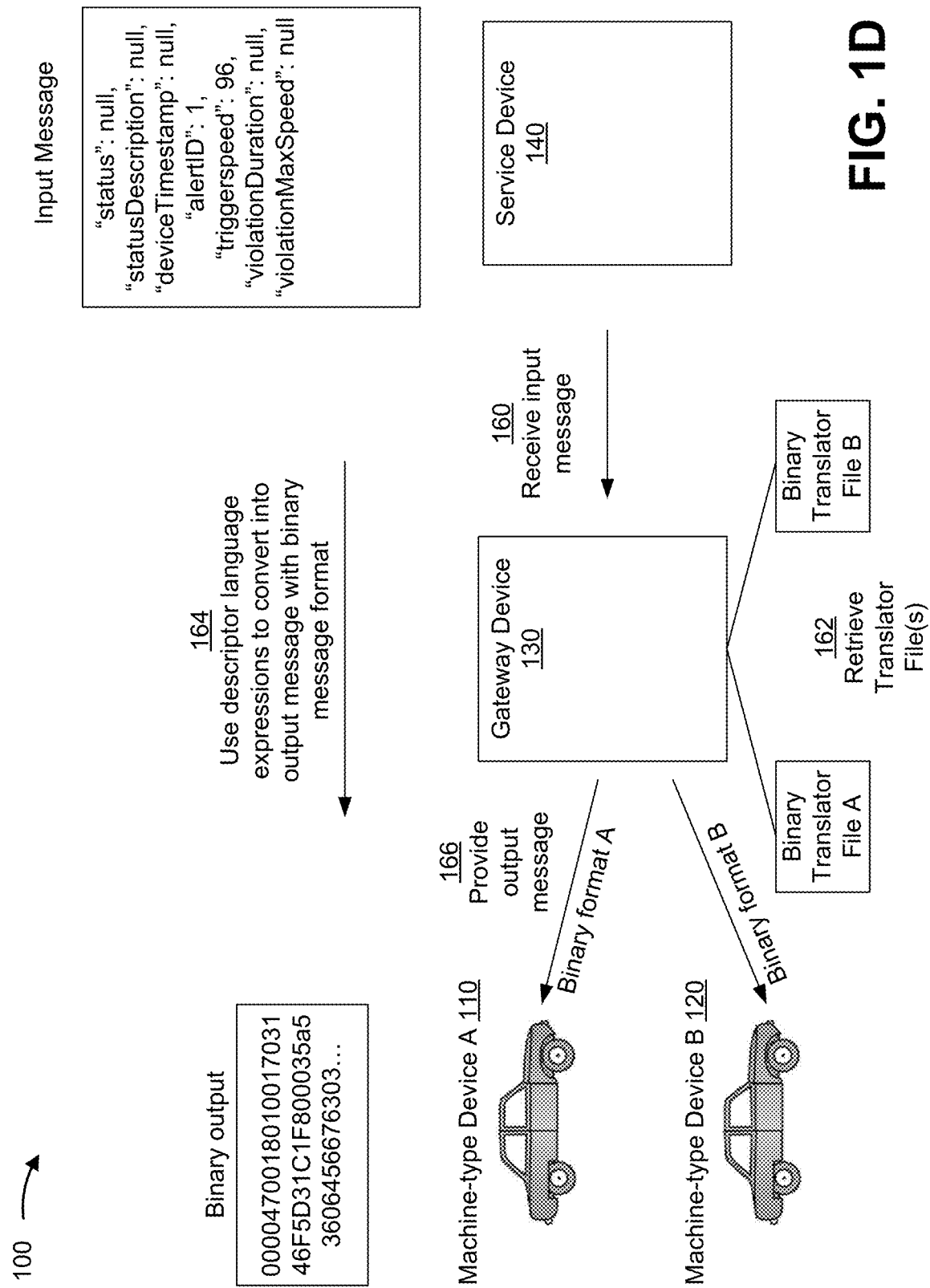

Additionally, and or alternatively, gateway device 130 may provide translation services in the other direction, from service device 140 to a machine-type device, such as machine-type device A 110 and/or machine-type device B 120. As shown by FIG. 1D, and by reference number 160, gateway device 130 may receive an input message from service device 140. The input message may be in a standard structured data format, such as a JSON format or an XML, format. In some implementations, gateway device 130 may convert the input message into another structured data format to be used by the parser (e.g. an XML-JSON conversion algorithm).

As shown by reference number 162, gateway device 130 may retrieve a binary translator file in order to convert the input message into a desired binary format. For example, gateway device 130 determine that the input message is being sent to machine type device A 110, and may retrieve binary translation file A to use for the translation. Gateway device 130 may determine the correct binary format in various ways, including as may be specified in the input message, the intended destination machine-type device A, the service device 140 from which the message was received, the source and/or destination address/port/line of the message, or other identifiers for the message or destination.

As shown by FIG. 1D, and by reference number 164, gateway device 130 may translate the input message using one or more descriptor language expressions in the binary translator file into an output message with a binary message encoding. The one or more descriptor language expressions in binary translator file A may map field name/value expressions in the input message to binary values inserted into the output message in a binary format A, intended for machine-type device A 110.

As shown by reference number 166, gateway device 130 may provide the output message to machine-type device A 110. Machine-type device A 110 may perform an operation using information from the output message. For example, machine-type device A 110 may be instructed to perform a service, provide a notification, activate or deactivate a feature, collect information, communicate with the vehicle or another device, reconfigure machine-type device A 110, and/or the like. Similar to the above-described advantages, gateway device 130 may save processing resources that would otherwise have been required for using, storing, developing, adding, maintaining, and/or rewriting a hard-coded translator specific to machine-type device A 110.

As a further example of the operations described in connection with FIGS. 1A-1D, an example of a JSON-formatted input message that may be sent from service device 140 and intended for machine-type device A 110 may be:

```
{
    "data": {
        "poiType":"AssistedSearch",
        "_comment_poiType":"AssistedSearch,POI",
        "poiFunction":"Update",
        "webSite":"MOSC",
        "_comment_webSite":"vendor, xx-MAPP",
        "routeID":"12333456",
        "poiRecordList":[
            {
                "poiId":12345,
                "externalPoiID":"AtlantaGAP",
                "userID":"12345678",
                "languageCode":"US",
                "poiName":"AtlantaGAP-POI",
                "category":"No Category",
                "streetNumber":"3161",
                "streetName":"Generic street name",
                "city":"Atlanta",
                "state":"GA",
                "zipCode":"31320",
                "country":"US",
                "latitude":12.34567,
                "longitude":-56.7890,
                "poiPhoneNumber":"+15551234567",
                "immediateDestinationFlag":true
            }
        ]
    }
}
```

This input message is related to a service that allows for searching for geographic points of interest, and may be provided by service device 140 to update information on machine-type device A 110. Gateway device 130 may recognize this input message and retrieve a binary translator file that includes the following descriptor language expression:

```
...
{
    "id": 1,
    "name": "phoneNumber",
    "mandatory": true,
    "start_bit": 0,
    "start_byte": 0,
    "bit_size": 0,
    "byte_size": 16,
    "type": "TXTDATA",
    "value": "${jsonpath:($.data.poiRecordList[*].poiPhoneNumber)}"
}
...
```

This descriptor language expression describes that the point of interest phone number (poiPhoneNumber) element located in the input message under the poiRecordList sub-element should be interpreted as text data type and expressed in the binary message at Byte0bit0 as a 16-byte length value. Further examples of the operation of the various implementations will be discussed below.

As indicated above, FIGS. 1A-1D are provided as an example. Other examples can differ from what is described with regard to FIGS. 1A-1D. In practice, there may be additional devices and/or networks, fewer devices and/or networks, different devices and/or networks, or differently arranged devices and/or networks than those shown in FIGS. 1A-1D.

As explained above in connection with FIGS. 1A-1D, descriptor language expressions may be used to translate between binary values and data field in a structured data format. Descriptor language expressions are constructed using a message descriptor language that provides for flexibility or data locations, types and lengths, and supports both primitive and complex data types. A general template for a message descriptor language expression is based on field/value mapping parameters as follows:

TABLE 1

Message Descriptor Language Field Description Syntax

| Parameter | Usage |
|---|---|
| ID | Index of the field location. May be used in lieu of Start_byte/Start_bit for message formats that have standard sequencing and data formats. |
| Name: | Name of the field. For "COMPOUND" types, this also specifies the file name for the descriptor language expression for the field. |
| Start_byte | Byte index of the start of binary data to be associated with this field. May be from the start of the message or a start of a portion of the message (e.g., where used in a complex data structure). |
| Start_bit | Bit index within the Start_byte where the binary data to be associated with this field value starts. |
| Byte_size | Length of the value in terms of number of bytes |
| Bit_size | Length of the value in terms of number of bits (will be added to the Byte_size to obtain total size). |
| Type | Specifies a data type for the field value. Example data types are: "INT" - Integer values, "CHAR" - Single byte values, "TEXTDATA" - String of UTF8 encoded Chars, "VARRAY" - Set of same type values repeated for a specified length, "COMPOUND") - complex structure with field of multiple types. |
| Subtype | Specifies a sub-type for data types that support subtypes. Examples - Type CHAR, may specify Subtype ASCII or NUMERIC. |
| Mandatory | Specifies if the field is mandatory for a valid message (true/false). |
| Value | Expression stating where a value should be read from a structured data input message or written to a structured data output message. For JSON-formatted messages, expression may be a JSONPath expression. For XML-formatted messaged, expression may be an XPath expression. Blank values may assume simple mapping of value to field name at current location in structured data. |
| Default | Specifies a default value to use if no value is present (optional fields). |

Descriptor language expressions themselves may be implemented as structured data elements, such that the descriptor language expressions can be specified in a hierarchical and/or ordered manner, and can be traversed by the parser in the same manner. An example of a binary translator file constructed of descriptor language expressions in a structured data format is as follows (JSON format):

```
{
   "name": " BinaryTranslatorFileName",
   "totalbyteSize": "15",
   "fields": {
      "field": [
         {
            "id": 0,
            "name": "Field0",
            "mandatory": true,
            "start_bit": 0,
            "start_byte": 0,
            "bit_size": 0,
            "byte_size":1,
            "type": "INT",
            "value": ""
         },
         ... // additional field descriptor language expressions would follow
      ]
   }
}
```

The format above includes file parameters that may be applicable to all descriptor language expressions in the file. For example, a file parameter may be a file name identifier ("name" field in the example), which allows for specification of a unique name for the file for use by the gateway device 130 in selecting needed binary translator files for a translation action. Another example file parameter may be a total size indication ("totalbyteSize" field in the above example), which may be used to limit message sizes, for example, where a particular binary format has message size limits. In such cases, the gateway device 130 may split an output binary message into multiple messages meeting the message size limit. The format includes a section ("Fields" field in the above example), where descriptor language expressions are set forth for use by the gateway device 130 in translations. Other file parameters are also possible.

In some implementations, a field for message description language versioning information may be included to enable different versions of the language to be used concurrently, which allows for language enhancements. For example, there may be different capabilities in future versions of the message description language, and a descriptor language expression (or a binary translator file containing descriptor language expressions) may include a value that indicates such a version. Gateway device 130 may perform translations using descriptor language expressions based on the version information.

As noted above, descriptor language expressions may express the location and size of data fields in more flexible terms, which may lead to more accurate and efficient message translations. For example, a descriptor language expression may indicate a size of a data field that is less than a byte (e.g., 1 bit, 3 bits, 7 bits), or a non-integer multiple of bytes (e.g., 2 Bytes and 3 bits). The data field may also be specified to start at a specific bit within a byte, and may extend across a boundary to another byte depending on the specified length. The example field template includes parameters for "Start Byte", "Start bit", "Byte_size" and "Bit_size" which allows for specification of detailed starting locations and lengths. If both a start byte and a start bit are specified, then a data field may start on the specified bit index of the start byte. For example, if a start byte of 4 and a start bit of 4 are both specified, then the parser will look for data starting at byte 4 in bit position 4. Starting positions may be determined relative to a portion of the binary message. For example, where a descriptor language expression is used as part of a complex type (described below), the start byte/bit values may be relative to the starting location of the complex type.

As noted above, in some implementations, descriptor language expressions may support a non-standard value length for a standard type. In the exemplary field message language template this is achieved by specifying the Type/Subtype values for the structured data field, while also specifying non-standard Byte_size/Bit_size values. For example, a field for an Integer data value may be defined with a Byte_size of 3 and a Bit_size of 2, while also specifying a data type of INT. In such a case the parser with extract a binary value of 26 bits (3 bytes+2 bits) and insert the field into the output message with the value expressed as an Integer type. This specification may be done on a field-by-field basis, such that within a single binary formatted message integer values of various lengths may be properly translated as Integer data types. The same functionality applies to other supported data types (e.g., CHAR, TEXTDATA)

In some implementations, an index parameter may be used, which may indicate a location for a data field in the message. The index may be useful for binary formats where non-standard data locations/sizes are not present, and the index may be used if there is no start byte or start bit specified in a field definition.

As noted above, the message descriptor language enables binary data to be translated into specified standard data types. In the example field definition, this is indicated in the Type/Subtype parameters. The data types supported will depend on the implementation, but common supported data types would include: Integer, Double (Float), Byte (Char), Text (Char Strings) and Boolean. In some implementations, sub-types of the foregoing can be specified (e.g., for Integer types supported subtypes might include Short, Long, Unsigned.) In some implementations a "Raw" or "Hexdump" data type may be included which may represent a binary bit string in a specified coding scheme (e.g., hexadecimal, octal, binary). Types may also include complex types, such as Arrays/Lists, Enumerations and "Compound" types, each of which will be explained below.

A descriptor language expression may include a default parameter, which may specify a default value for the field. This may be useful for fields are expected by the destination system but not always be provided in the input message. In some implementations, the default value, when present, is used for fields which have a mandatory requirement (e.g., a mandatory parameter set to true). In other implementations, the default value, when present, is only used for fields which are not marked as mandatory (e.g., a mandatory parameter set to false)—which may be useful to enforce mandatory data requirements.

The field description parameters described above with reference to Table 1 are examples, and other implementations may include some or all of these parameters, and may include other parameters. For example, additional parameters will be described below in the discussion of conditional expressions and enumerations.

As noted above, in some implementations, a descriptor language expression may include a "Compound" type that indicates that a respective field is composed of multiple fields. That is, a field may be a collection of multiple fields. The message descriptor language includes a mechanism through which compound descriptor language expressions may be constructed for message parsing, through cross-referencing to other binary translator files. The following descriptor language expression references a type named "TcuInfo", which is defined in a separate file:

```
File Name: "TcuCurrData"
{
    "name": "TcuCurrData",
    "totalbyteSize": "8",
    "fields" :
    {
        "field" :
        [
            {
                "id": 0,
                "name": "TcuInfo",
                "mandatory": true,
                "start_bit": 0,
                "start_byte": 0,
                "bit_size": 0,
                "byte_size": 0,
                "type": "Compound",
                "value": ""
            },
            ... // add'l DL expressions here omitted
```

-continued

```
        ]
    }
}
File Name: "TcuInfo.json"
{
    "name": "TcuInfo",
    "totalbyteSize": "8",
    "fields" :
    {
        "field" :
        [
            {
                "id"         : 0,
                "name"                  :"tcuHwPartNumber",
                "mandatory"             : true,
                "start_bit"             : 0,
                "start_byte"            : 0,
                "bit_size"              : 8,
                "byte_size"             : 0,
                "loop" : 15,
                "type" : "CHAR_ARRAY",
                "subType"               : "HWPART",
                "value"                 : ""
            },
            {
                "id"         : 1,
                "name"                  :"imsi",
                "mandatory"             : true,
                "start_bit"             : 0,
                "start_byte"            : 0,
                "bit_size"              : 4,
                "byte_size"             : 0,
                "loop": 15,
                "type" : "CHAR_ARRAY",
                "subType"               : "NUMERIC",
                "value"                 : "",
                "default":              0
            },
            {
                "id": 2,
                "name":"vin",
                "mandatory"             : true,
                "start_bit": 0,
                "start_byte"            : 0,
                "bit_size": 7,
                "byte_size"             : 0,
                "loop": "17",
                "type" : "CHAR_ARRAY",
                "subType"               : "ASCII",
                "value":""
            },
            ... // add'l DL expressions here omitted
            {
                "id": 10,
                "name":"msisdn",
                "mandatory": true,
                "start_bit": 0,
                "start_byte"            : 0,
                "bit_size": 4,
                "byte_size"             : 0,
                "loop": 15,
                "type" : "CHAR_ARRAY",
                "subType": "NUMERIC",
                "value": ""
            }
        ]
    }
}
```

In the above example, when the parser is processing the translator file "TcuCurrData", upon processing the field "TcuInfo," the parser will detect the "Compound" type indicator in the Type parameter. The parser will then use the value of the "Name" parameter ("TcuInfo") to retrieve a binary translator file have the same name, and include the descriptor language expressions in that file as part of the message translation. An example of a possible output message using the "TcuCurrData" translator file is:

```
{
    "TcuInfo": {
        "tcuHwPartNumber": ABCDE12345,
        "imsi": 5012109280,
        "vin": ABCD1234GHFI789,
        ... // add'l fields here omitted
        "msisdn": 123456789
    },
    ... // add'l fields here omitted
}
```

Note that the field TcuInfo is expressed as a structured data object with multiple fields, and the fields are generated according to the descriptor language expressions provided in the TcuInfo translator file.

The Compound type can be used to refer to any other binary translator file. This capability allows for reuse of descriptor language expressions in multiple translation situations. Following from the last example, if a service device 140 wants to send an update message to the machine-type device that provided the "TcuCurrInfo" message, and the update message requires the inclusion of the "TcuInfo" value, the TcuInfo translator file may be reused by including it as a Compound type:

```
{
    "name": "TcuDataUpdate",
    "totalbyteSize": "39",
    "fields" :
    {
        "field" :
        [
            {
                "id": 0,
                "name": "TcuInfo",
                "mandatory": true,
                "start_bit": 0,
                "start_byte": 0,
                "bit_size": 0,
                "byte_size": 0,
                "type": "Compound",
                "value": ""
            },
            {
                "id": 1,
                "name":"msgVersion",
                "mandatory": true,
                "start_bit": 0,
                "start_byte" : 0,
                "bit_size": 0,
                "byte_size": 1,
                "type": "SHORT",
                "default": 3,
                "value": "${input:msgVersion.value}",
                "validRange":
                {
                    "from":0,
                    "to":127
                }
            },
            ... // Add'l DL expressions omitted
        ]
    }
}
```

In some implementations, one or more ARRAY data types may be supported, which may define a list of fields of a same type, whether Compound or primitive. Where an ARRAY type is used, a "loop" parameter may be specified to include an expression that indicates how the contents of the ARRAY should be populated with values. As one example usage, note the use of a CHAR_ARRAY type when defining the translation of the "imsi" field in the TcuInfo example above (relevant portion below):

```
{
    "id"         : 1,
    "name"       :"imsi",
    "mandatory"  : true,
    "start_bit"  : 0,
    "start_byte" : 0,
    "bit_size"   : 4,
    "byte_size"  : 0,
    "loop": 15,
    "type" : "CHAR_ARRAY",
    "subType"    : "NUMERIC",
    "value"      : "",
    "default":     0
},
```

The example translates 15 (loop=15) 4-bit values (bit_size=4) into a character array (type=CHAR_ARRAY) of numbers (subType=NUMBERS). A sample output of this translation might be: "000005012109280".

The ARRAY type can also be used to create lists of multiple Compound values. In the example implementation, a VARRAY type is used to indicate an array type of Compound type, which is an indication to the parser to retrieve the associated descriptor language expressions from the translator file that map to the field name. As an example, the following translator file for a geofence notification message includes descriptor language expressions for an array of reports associated with each geofence that is currently active:

```
File: GeofenceNotificationMessage
{
    "name": " GeofenceNotificationMessage ",
    "totalbyteSize": "",
    "fields": {
        "field": [
            ... // Field DL expressions omitted
            {
                "id": 5,
                "name": "activeFenceCount",
                "mandatory": true,
                "start_bit": 0,
                "start_byte": 0,
                "bit_size": 0,
                "byte_size":1,
                "type": "INT",
                "value": ""
            }
            {
                "id": 6,
                "name": "activeFenceReport",
                "mandatory": true,
                "start_bit": 0,
                "start_byte": 0,
                "bit_size": 0,
                "byte_size": 0,
                "loop": "${runtime:(activeFenceCount.value)}",
                "type": "VARRAY",
                "value": ""
            }
        ]
    }
}
File: activeFenceReport
{
    "name": "activeFenceReport",
    "totalbyteSize": "",
    "fields": {
        "field": [
```

-continued

```
{
    "id": 0,
    "name": "alertId",
    "mandatory": true,
    "start_bit": 0,
    "start_byte": 0,
    "bit_size": 6,
    "byte_size": 0,
    "type": "SHORT",
    "value": ""
},
{
    "id": 1,
    "name": "trigger",
    "mandatory": true,
    "start_bit": 0,
    "start_byte": 0,
    "bit_size": 3,
    "byte_size": 0,
    "type": "INTTOENUM",
    "enum_name": "GeofenceTrigger",
    "value": "${enums:(trigger.value)}"
}
    ]
  }
}
```

Because the field type of field "activeFenceReport" is indicated as VARRAY, the parser retrieves the translator file "activeFenceReport," and includes the descriptor language expressions from that file when parsing the message. The loop counter specifies a variable length, based on a previously defined value—"activeFenceCount."

```
{
    ... // fields omitted
    "activeFenceCount": 1,
    "activeFenceReport": [
        {
            "alertId": 1,
            "trigger": InToOut
        }
    ],
    ... // fields omitted
}
```

The loop counter may also specify a variable length based on an element count of an input structured data message. An example of this is:

```
{
    "id": 1,
    "name": "gpsPosition-poiRecordList",
    "mandatory": true,
    "start_bit": 0,
    "start_byte": 0,
    "bit_size": 0,
    "byte_size": 8,
    "loop": "${jsonpath:($.data.poiRecordList.length( ))}",
    "type": "VARRAY",
    "value": ""
}
```

In this example, the loop will run for as many elements are in the "poiRecordList" array of the input structured data message.

In some implementations, the message descriptor language may include support for enumeration data types, for example, indicated with an "ENUM" or "INTTOENUM" indicator as the data type. A common occurrence in message encoding is that a field of a message can hold a value from only a predefined set of constants. In a binary message, these constants are typically represented by an integer value, however in the standard format these values may map to specific text strings or values other than the integer value of the message. The INTTOENUM data type may be used to describe a message field that should be translated as an enumeration, and provide a way to map between a binary integer value and the enumeration value. The following example shows the use of the enumeration data type in the context of a geofence response message, which includes a field that describes the status of a geofence:

```
File: GeofenceResponseMessage
{
    "name": " GeofenceResponseMessage ",
    "totalbyteSize": "",
    "fields": {
        "field": [
            ... // other field DL expressions omitted
            {
                "id": 4,
                "name": "armStatus",
                "mandatory": true,
                "start_bit": 0,
                "start_byte": 0,
                "bit_size": 3,
                "byte_size": 0,
                "type": "INTTOENUM",
                "enum_name": "GeofenceArmStatus",
                "value": "${jsonpath:($.data.geofence.armStatus)}"
            },
            ... // other field DL expressions omitted
        ]
    }
}
File: GeofenceArmStatus
{
    "name": " GeofenceArmStatus ",
    "enumName": "GeofenceArmStatus",
    "enumValues": [
        {"key":"armed","value": "1"},
        {"key":"unarmed","value": "2"},
        {"key":"suspendedUntilDate","value": "3"}
        ... // other enum values (if any) defined here
    ]
}
```

In the example above, field "armStatus" is defined as an enumeration (type="INTTOENUM") data type with a size of 3 bits (Byte_size=0, Bit_Size=3). An enumeration parameter in the descriptor language expression ("enum_name"="GeofenceArmStatus") indicates where a translator file can be found (file with the name "GeofenceArmStatus") that defines the mapping between the values in the binary format {1, 2, 3} and the enumerated values {"armed", "unarmed", "suspendedUntilDate"}. An example of an output message in a structured data format based on the translator file above may be:

```
{
    "data":{
        "geofence":[
            {
                "aliasName":"name 123456",
                "alertId":5,
                "subAlertId":5,
                "alertType":null,
                "popupFlag":0,
                "armStatus":"armed",
                "geofenceType":"Circle",
                "suspendedUntilDate":1234567876543,
                ... // other fields omitted
            }
```

]
        }
}

In some implementations, the message descriptor language may support a capability to force field data into a certain size, for example, by "padding" any missing data with a default value. For example, a binary format may require that certain values be always presented as a set size (e.g., 4 bytes long). If the value is smaller than the set size, it would need to be padded to ensure the value fits the expected size, without affecting the meaning of the value. The message descriptor language includes a padding parameter—e.g., a "pad" parameter and/or a "filler" parameter—that allows for padding indicators to be specified. The following example shows a descriptor language expression for an IMEI field, which is required to be a 16-digit integer value:

```
{
    "id": 14,
    "name":"imei",
    "mandatory": true,
    "start_bit": 4,
    "start_byte": 13,
    "bit_size": 4,
    "byte_size": 0,
    "loop": 16,
    "pad": "LEFT",
    "type": "CHAR_ARRAY",
    "subType": "NUMERIC",
    "value": "",
    "filler": "0"
}
```

In this example, if the imei field value is less than the total expected size ("loop"=16), it will have the character "0" ("filler"="0") inserted into its leftmost positions ("pad"="LEFT") in order to make the output value contain 16 numbers ("subtype"="NUMERIC"). Using this example, an input structured data message that had an "imei" field of "35555606463839" would generate an output binary format message with a binary value starting in location Byte13Bit4 of "0035555606463839" (i.e., two "0" numbers added to the leftmost portion).

In some implementations, the message descriptor language may support a valid range capability which allows restrictions on values for message fields, which may be used, for example, to perform error checking and fault handling in translations. For example, the message descriptor language may include a valid range parameter (e.g., "validRange") that can be included in descriptor language expressions to specify a valid range of values that a field may hold. In the following example, a message discard field is an enumerated field that may have binary values between 0 and 5 (and thus if it reports a value of "6", this indicates an error condition exists):

```
{
    "id": 10,
    "name"        :"msgDiscard",
    "mandatory": true,
    "start_bit": 4,
    "start_byte": 21,
    "bit_size"    : 4,
    "byte_size": 0,
    "type": "INT",
    "enum_name": "msgDiscard",
    "value"       : "${enums:(msgDiscard.value)}",
    "default"     : 0,
    "validRange" :
    {
        "from":0,
        "to":5
    }
}
```

If an input binary format message indicated a value for the msgDiscard field (at location Byte21Bit4 with a bit size of 4) of 2, translation would be processed normally. However, if an input binary format message indicated a value for the msgDiscard field of 6, the parser would read the valid range parameter ("validRange": {"from":"0" "to":"5"}) and recognize that the value is outside the valid range of values. This would cause the parser to raise an error condition, for example, by logging an error, sending an error report to an interface of gateway device 130, sending an error report to the service device 140, or other error handling.

In some implementations, the message descriptor language may support a capability to do conditional evaluations with respect to parameters used to perform translations. For example, some translations may be conditional depending on whether certain fields in a message have certain values associated with them. The message descriptor language may include conditional indicators (e.g., a "conditional" parameter and/or a "condition" operator) that allow fields to be translated according on the occurrence of specified conditions. As an example, the following descriptor language expression only generates a "truckData" data field when another data field "parameterType" has a value equal to "truck":

```
{
    "id": 11,
    "name":"truckData",
    "mandatory"                : true,
    "start_bit": 0,
    "start_byte"               : 0,
    "bit_size": 0,
    "byte_size": 5,
    "conditional":
    "${condition:(jsonpath:($.configDetails[*].parameterType))-eq-
    ""truck""}",
    "type" : "Compound",
    "value": ""
},
{
    "id": 12,
    "name":"carData",
    "mandatory"                : true,
    "start_bit": 0,
    "start_byte"               : 0,
    "bit_size": 0,
    "byte_size": 3,
    "conditional":
    "${condition:(jsonpath:($.configDetails[*].parameterType))-noteq-
    ""truck""}",
    "type": "Compound",
    "value": ""
}
```

In this example, the data field "truckData" is only included in the message when the "parameterType" field equals the value "truck":
  "conditional": "$ {condition: (jsonpath:($.configDetails
    [*].parameterType))-eq-""truck""}"

When the parameterType field does not equal "truck," the data field "carData" is used:

"conditional": "$ {condition: (jsonpath:($.configDetails [*].parameterType))-noteq-""truck""}"

In each case, the translation uses Compound data types that may be obtained from the binary translation files associated with the field selected by the conditional parameters (e.g., "truckData" or "carData"), as noted above.

In some implementations, the message descriptor language may support a capability to reference other executable functionality to obtain values needed to comply with message formats. For example, a message format may require a specific timestamp information, security credentials, or other information that may not be provided by the input message. The message descriptor language may provide an operator that allows for access to an externally-provided function (e.g., a "provider" operator) to obtain a value for a field. As an example, the following descriptor language expression includes a field for a number of seconds from a reference time that is required in an output message but is not specified in the input message:

```
{
    "id": 8,
    "name":"numSecond",
    "mandatory"          : true,
    "start_bit": 0,
    "start_byte"         : 0,
    "bit_size": 0,
    "byte_size": 3,
    "type" : "INT",
    "value": "${provider:numSeconds}"
}
```

In this example, the value of the field numSeconds is set with the value returned from a call to the function numSeconds ("value": "${provider:numSeconds}"). The name of the external functionality to invoke may be specified according to any calling convention, for example, by an API definition, and may include passed parameters where specified.

FIG. 2 is a diagram of an example environment 200 in which systems and/or methods described herein may be implemented. As shown in FIG. 2, environment 200 may include machine-type devices 210, gateway device 220, service device 230, and a network 240. Devices of environment 200 may interconnect via wired connections, wireless connections, or a combination of wired and wireless connections.

A machine-type device 210 includes one or more devices capable of receiving, generating, storing, processing, and/or providing information associated with messages using a binary format, as described above. For example, machine-type device 210 may include a communication and/or computing device, such as a sensor device, a radio frequency identifier device, a controller device and/or the like. Machine-type device 210 may include devices embedded in other devices such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), a vehicle (e.g., an automobile, an aerial drone, an autonomous vehicle), an industrial device (e.g., robots), a metering device (e.g., electric meter, water meter) or a similar type of device.

Gateway device 220 includes one or more devices capable of receiving, generating, storing, processing, and/or providing information associated with binary format messages and message transformation using a message descriptor language. For example, gateway device 220 may include a communication and/or computing device, such as a server, a server farm, a desktop computer, a mainframe computer, a cloud computing environment, a distributed computing environment, or a similar type of device. Gateway device 220 may be a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Service device 230 includes one or more devices capable of receiving, generating, storing, processing, and/or providing information associated with binary format messages that have been translated into a standard format message. For example, service device 230 may include a communication and/or computing device, such as a server, a server farm, a desktop computer, a mainframe computer, a cloud computing environment, a distributed computing environment, or a similar type of device. Service device 230 may be a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device. Service device 230 may include one or more applications executing on service device 230 that send and/or receive messages using the standard format.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
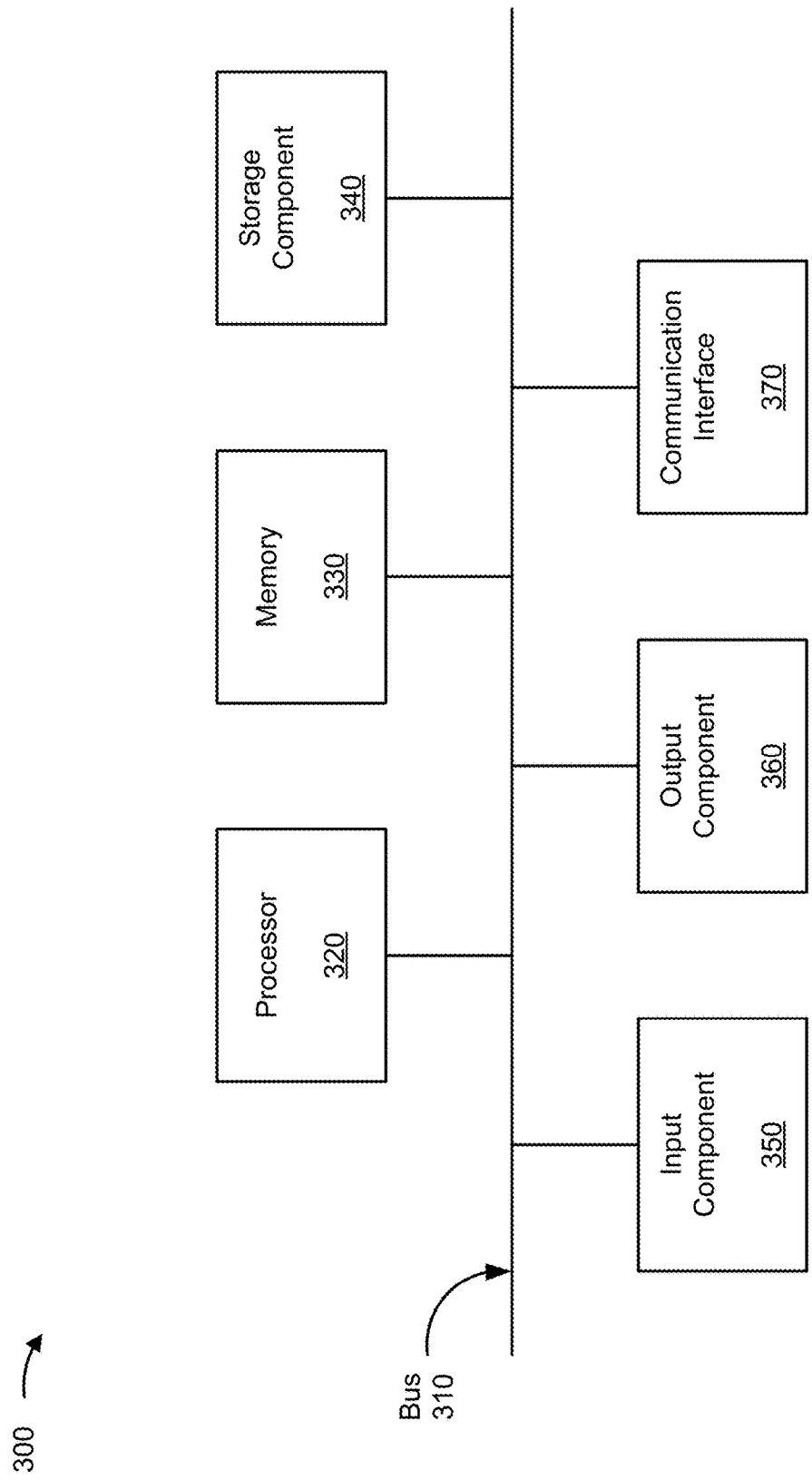
FIG. 3 is a diagram of example components of one or more devices of FIG. 2.

FIG. 3 is a diagram of example components of a device 300. Device 300 may correspond to machine-type device 210, gateway device 220, and/or service device 230. In some implementations, machine-type device 210, gateway device 220, and/or service device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for systems and methods for binary message transformation using a message descriptor language with custom descriptors. In some implementations, one or more process blocks of FIG. 4 may be performed by a gateway device (e.g., gateway device 220). In some implementations, one or more process blocks of FIG. 4 may be performed by another device or a group of devices separate from or including the gateway device, such as a machine-type device (e.g., machine-type device 210), a server device (e.g., service device 230), and/or the like.

As shown in FIG. 4, process 400 may include receiving a message originating from a machine-type device or being sent to a machine-type device (block 410). In some implementations, the machine-type device uses any one of a plurality of binary formats for encoding of messages used with the device. The binary format may specify message values with non-standard locations or sizes, as well as other requirements. For example, the gateway device (e.g., using processor 320, memory 330, storage component 340, input component 350, output component 360, communication interface 370 and/or the like) may receive an input message originating from a first machine-type device in a first binary format and intended for a service device, as described above. As another example, the gateway device may receive an input message in a first structured data format from the service device and intended for the first machine type device, as described above.

As further shown in FIG. 4, process 400 may include determining that the input message is associated with a first binary format (block 420). For example, the gateway device (e.g., using processor 320, memory 330, storage component 340, input component 350, output component 360, communication interface 370 and/or the like) may determine that the input message is associated with the first binary format, for example, because the input message originated from the first machine-type device, the input message is destined for the machine-type device, or another method of determination, as described above.

As further shown in FIG. 4, process 400 may include identifying one or more descriptor language expressions that are applicable to the message (block 430). In some implementations, a descriptor language expression defines a translation between a structured data format and a binary format. In some implementations, a descriptor language expression is expressed in message descriptor language and defines a data field with a field name and a field value mapping. In some implementations, the descriptor language expression includes a field location and field size that is capable of bit-level customization.

As further shown in FIG. 4, process 400 may include generating an output message from the one or more descriptor language expressions (block 440). For example, the gateway device (e.g., using processor 320, memory 330, storage component 340, input component 350, output component 360, communication interface 370 and/or the like) may generate an output message from the one or more descriptor language expressions, as described above.

As further shown in FIG. 4, process 400 may include providing the output message to the destination device (block 450). For example, where the input message is destined for the service device, the gateway device (e.g., using processor 320, memory 330, storage component 340, input component 350, output component 360, communication interface 370 and/or the like) may provide the output message in the first structured data format to the service device, as described above. Where the input message is destined for the first machine-type device, the gateway device may provide the output message in the first binary format to the first machine-type device, as described above.

Process 400 may include additional implementations, such as any single implementation or any combination of implementations described below and/or in connection with one or more other processes described elsewhere herein.

In a first implementation, a field size for each of the one or more descriptor language expressions is capable of being 1 bit to 7 bits in length.

In a second implementation, alone or in combination with the first implementation, the method may include dynamically setting, for at least one of the one or more descriptor language expressions, a field size based on format information.

In a third implementation, alone or in combination with one or more of the first and second implementations, a respective starting position for a field for each of the one or more descriptor language expressions is capable of being between a second bit of a byte and a seventh bit of a byte.

In a fourth implementation, alone or in combination with one or more of the first through third implementations, a field value for each of the one or more descriptor language expressions is capable of being defined as extending across one or more byte boundaries such that the field value starts in a first byte and ends in a second byte.

In a fifth implementation, alone or in combination with one or more of the first through fourth implementations, the output message is one of a JavaScript® object notation (JSON) message, an extensible markup language (XML) message, or a hypertext transfer protocol (HTTP) message.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software.

In some implementations, alone or in combination with one or more other implementations, process 400 may include dynamically setting a field size for a short, integer, or long field type to 1 bit to 15 bits in length. Process 400 may include dynamically selecting, for each of the one or more descriptor language expressions and based on the first format information, a field size for a field from among a plurality of field sizes available for a type of the field. Process 400 may include dynamically setting a respective starting position for a field to be in a byte such that, based on a field size of the field, a respective ending position of the field is between a second bit and a seventh bit of a subsequent byte.

In some implementations, alone or in combination with one or more other implementations, each of the one or more descriptor language expressions may include a version value indicated in the first format information, and process 400 may include dynamically setting a field size for each of the one or more descriptor language expressions based on the version value.

In some implementations, alone or in combination with one or more other implementations, the message may be associated with an index indicating a location for each data field in the message, and process 400 may include parsing the message using an index counter. Each descriptor language expression may include a respective index value corresponding to the index.

The foregoing disclosure provides illustration and description, but is not intended to be exhaustive or to limit the implementations to the precise form disclosed. Modifications and variations may be made in light of the above disclosure or may be acquired from practice of the implementations.

In some implementations, alone or in combination with one or more other implementations, at least one of the one or more descriptor language expressions may include a conditional operator that defines a field value as depending on a field value of another one of the one or more descriptor language expressions. At least one of the one or more descriptor language expressions may include an enumeration of integer values that correspond to respective descriptions for the integer values.

In some implementations, alone or in combination with one or more other implementations, process 400 may include dynamically setting a field size of a field, based on the first format information, the second format information, or both. Process 400 may include dynamically setting a respective starting position for a field. At least one of the one or more descriptor language expressions may include a compound field type that indicates that a respective field is composed of a plurality of fields.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, a first message originating from a first machine-type device and intended for a service device, the first message containing at least one first message binary value,
      wherein the first message uses a first binary message format, of a plurality of binary message formats;
   determining, by the device, that the first message uses the first binary message format;
   identifying, by the device and based on the first binary message format, a first set of descriptor language expressions applicable to the first message, wherein at least one of the first set of descriptor language expressions defines a mapping between the at least one first message binary value and a first structured data format having a first field name and a first field value,
      wherein the mapping includes a first expression indicating a location, between a second bit of a byte and a seventh bit of the byte, of the at least one first message binary value within the first message;
   generating, by the device using the first set of descriptor language expressions, a first output message in the first structured data format, the first output message containing the at least one first message binary value translated into the first structured data format using the first field name and the first field value; and
   providing, by the device, the first output message to the service device.

2. The method of claim 1, further comprising:
   receiving, by the device, a second message originating from a second machine-type device and intended for the service device, the second message containing at least one second message binary value using a second binary message format, of the plurality of binary message formats;
   determining, by the device, that the second message uses the second binary message format, wherein the second binary message format is different from the first binary message format;
   identifying, by the device and based on the second binary message format, a second set of descriptor language expressions applicable to the second message, wherein at least one of the second set of descriptor language expressions defines a mapping between the at least one second message binary value and the first structured data format having a second field name and a second field value, and wherein the second set of descriptor language expressions are different from the first set of descriptor language expressions;
   generating, by the device using the second set of descriptor language expressions, a second output message in the first structured data format, the second output message containing the at least one second message binary value translated into the first structured data format using the second field name and the second field value; and
   providing, by the device, the second output message to the service device.

3. The method of claim 2, wherein the first field name and the second field name are the same.

4. The method of claim 1, wherein the mapping further includes
   a second expression indicating a size of the at least one first message binary value within the first message expressed as a bit-wise size.

5. The method of claim 1, wherein the first structured data format is one of a JavaScript object notation (JSON) format or an extensible markup language (XML) format.

6. The method of claim 1, wherein, prior to providing the first output message, the method includes:
   converting the first structured data format of the first output message into a second structured data format different than the first structured data format.

7. A device, comprising:
   one or more processors configured to:
      receive a first message originating from a first machine-type device and intended for a service device, the first message containing at least one first message binary value,
         wherein the at least one first message binary value uses a first binary message format, of a plurality of binary message formats,
      determine that the first message uses the first binary message format,
      identify, based on the first binary message format, a first set of descriptor language expressions applicable to the first message, wherein at least one of the first set of descriptor language expressions defines a mapping between the at least one first message binary value and a first structured data format having a first field name and a first field value,
         wherein the mapping includes a first expression indicating a location, between a second bit of a byte and a seventh bit of the byte, of the at least one first message binary value within the first message,
      generate, using the first set of descriptor language expressions, a first output message in the first structured data format, the first output message containing the at least one first message binary value translated into the first structured data format using the first field name and the first field value, and
      provide the first output message to the service device.

8. The device of claim 7, wherein the one or more processors are further configured to:
   receive a second message originating from a second machine-type device and intended for the service device, the second message containing at least one second message value using a second binary message format, of the plurality of binary message formats, determine that the second message uses the second binary message format, wherein the second binary message format is different from the first binary message format, identify, based on the second binary message format, a second set of descriptor language expressions applicable to the second message, wherein at least one of the second set of descriptor language expressions defines a mapping between the at least one second message binary value and the first structured data format having a second field name and a second field value, and wherein the second set of descriptor language expressions are different from the first set of descriptor language expressions, generate, using the second set of descriptor language expressions, a second output message in the first structured data format, the second output message containing the at least one second message binary value translated into the first structured data format using the second field name and the second field value, and provide the second output message to the service device.

9. The device of claim 7, wherein the mapping further includes
 a second expression indicating a size of the at least one first message binary value within the first message expressed as a bit-wise size.

10. The device of claim 7, wherein the mapping further includes a reference to a third set of descriptor language expressions different than the first set of descriptor language expressions and associated with the first field name.

11. The device of claim 7, wherein the mapping further includes a second expression that conditionally includes the first field name and the first field value in the first output message when a condition is satisfied, wherein the condition is associated with one of the at least one first message binary value.

12. The device of claim 7, wherein the mapping further includes a loop indicator to loop through the at least one first message binary value to determine the first field value.

13. A method, comprising:
 receiving, by a device, a first message originating from a service device and intended for a first machine-type device, the first message using a first structured data format having a first field name and a first field value;
 determining, by the device, that the first machine-type device uses a first binary message format of a plurality of binary message formats;
 identifying, by the device and based on the first binary message format, a first set of descriptor language expressions applicable to the first message, wherein at least one of the first set of descriptor language expressions defines a mapping between the first structured data format having the first field name and the first field value and at least one first message binary value,
  wherein the mapping includes a first expression indicating a location, between a second bit of a byte and a seventh bit of the byte, of the at least one first message binary value within a first output message;
 generating, by the device using the first set of descriptor language expressions, the first output message in the first binary message format, the first output message containing the at least one first message binary value at the location; and
 providing, by the device, the first output message to the first machine-type device.

14. The method of claim 13, further comprising:
 receiving, by the device, a second message originating from the service device and intended for a second machine-type device, the second message in the first structured data format and having a second field name and second field value;
 determining, by the device, that the second machine-type device uses a second binary message format, of the plurality of binary message formats, wherein the second binary message format is different from the first binary message format;
 identifying, by the device and based on the second binary message format, a second set of descriptor language expressions applicable to the second message, wherein at least one of the second set of descriptor language expressions defines a mapping between the first structured data format having the second field name and the second field value and at least one second message binary value, and wherein the second set of descriptor language expressions are different from the first set of descriptor language expressions;
 generating, by the device using the second set of descriptor language expressions, a second output message in the second binary message format, the second output message containing the at least one second message binary value; and
 providing, by the device, the second output message to the second machine-type device.

15. The method of claim 13, wherein the mapping further includes
 a second expression indicating a size of the at least one first message binary value within the first output message expressed as a bit-wise size.

16. The method of claim 13, wherein the first structured data format is one of a JavaScript object notation (JSON) format or an extensible markup language (XML) format.

17. The method of claim 13, wherein receiving the first message includes:
 converting the first message from a second structured data format into the first structured data format, wherein the second structured data format is different than the first structured data format.

18. The method of claim 1, further comprising:
 obtaining, based on determining that the first message uses the first binary message format, a first binary translator file, of a plurality of binary translator files,
  wherein the first binary translator file includes the first set of descriptor language expressions, and
  wherein the first binary translator file has been generated based on one or more descriptor language expressions from previously-generated binary translator files, of the plurality of binary translator files.

19. The device of claim 7, wherein the one or more processors are further to:
 obtain, based on determining that the first message uses the first binary message format, a first binary translator file, of a plurality of binary translator files,
  wherein the first binary translator file includes the first set of descriptor language expressions, and
  wherein the first binary translator file has been generated based on one or more descriptor language expressions from previously-generated binary translator files, of the plurality of binary translator files.

20. The method of claim 1, further comprising:
obtaining, based on determining that the first machine-type device uses the first binary message format, a first binary translator file, of a plurality of binary translator files,
   wherein the first binary translator file includes the first set of descriptor language expressions, and
   wherein the first binary translator file has been generated based on one or more descriptor language expressions from previously-generated binary translator files, of the plurality of binary translator files.

* * * * *